(12) United States Patent
Harada et al.

(10) Patent No.: US 12,122,006 B2
(45) Date of Patent: Oct. 22, 2024

(54) MACHINE TOOL INCLUDING ROTATION INDEXING DEVICE

(71) Applicants: KOMATSU NTC LTD., Toyama (JP); TSUDAKOMA KOGYO KABUSHIKI KAISHA, Ishikawa-ken (JP)

(72) Inventors: Yoshiki Harada, Toyama (JP); Yohei Ikeda, Ishikawa-ken (JP)

(73) Assignees: KOMATSU NTC LTD., Toyama (JP); TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 218 days.

(21) Appl. No.: 17/751,168

(22) Filed: May 23, 2022

(65) Prior Publication Data

US 2022/0388104 A1    Dec. 8, 2022

(30) Foreign Application Priority Data

Jun. 7, 2021    (JP) ................. 2021-094860

(51) Int. Cl.
*B23Q 1/64*    (2006.01)
*B23Q 1/01*    (2006.01)
*B23Q 1/54*    (2006.01)

(52) U.S. Cl.
CPC .............. *B23Q 1/64* (2013.01); *B23Q 1/015* (2013.01); *B23Q 1/5468* (2013.01)

(58) Field of Classification Search
CPC .... B23Q 1/5468; B23Q 1/5437; B23Q 1/015; B23Q 1/01
See application file for complete search history.

(56) References Cited

U.S. PATENT DOCUMENTS

2012/0158170 A1    6/2012    Bornemann et al.
2016/0147216 A1    5/2016    Bornemann et al.

FOREIGN PATENT DOCUMENTS

| CN | 112045492 A | 12/2020 | |
| DE | 102010035668 A1 | 3/2012 | |
| DE | 102020102272 A1 * | 8/2020 | ............... B23Q 1/52 |
| EP | 2465639 A2 | 6/2012 | |
| JP | 2020-044614 A | 3/2020 | |
| KR | 10-2010-0000967 A | 1/2010 | |
| KR | 10-2014-0080785 A | 7/2014 | |
| KR | 20140080785 A * | 7/2014 | |

OTHER PUBLICATIONS

Oct. 31, 2022, European Search Report issued for related EP Application No. 22175122.5.

* cited by examiner

*Primary Examiner* — Tyrone V Hall, Jr.
(74) *Attorney, Agent, or Firm* — Paratus Law Group, PLLC (57) ABSTRACT

A machine tool includes a rotation indexing device. The rotation indexing device includes a frame accommodates a rotary shaft, a drive motor rotationally drives the rotary shaft, a drive transmission mechanism accommodated in a space inside the frame, and a detection device. The drive transmission mechanism includes a gear mechanism, and the space includes one or more storage parts for storing lubricating oil. The detection device detects a height position of an oil level of the lubricating oil, and is provided on a one-to-one basis with respect to a detection target storage part, which is set as a detection target, of the one or more storage parts.

2 Claims, 6 Drawing Sheets

MACHINE TOOL INCLUDING ROTATION INDEXING DEVICE

CROSS-REFERENCE TO RELATED APPLICATION(S)

This application is based on and claims priority under 35 USC 119 from Japanese Patent Application No. 2021-094860 filed on Jun. 7, 2021, the contents of which are incorporated herein by reference.

TECHNICAL FIELD

The present invention relates to a machine tool including a rotation indexing device for indexing an angular position of a rotation target member attached to an end portion of a rotary shaft, the rotation indexing device including a frame configured to accommodate the rotary shaft in a state of rotatably supporting the rotary shaft, a drive motor configured to rotationally drive the rotary shaft, and a drive transmission mechanism accommodated in a space inside the frame and configured to transmit rotation of an output shaft of the drive motor to the rotary shaft, wherein the drive transmission mechanism includes a gear mechanism and the space includes one or more storage parts for storing lubricating oil for lubricating at least the gear mechanism.

BACKGROUND ART

PTL 1 discloses a machine tool including a rotation indexing device as described above. The machine tool disclosed in PTL 1 includes an NC circular table device (rotation indexing device) having a rotary table configured so that a workpiece can be attached thereto. In the rotation indexing device, the frame is formed as a housing having a space therein. In the space in the frame (housing), a rotary shaft having one end to which a table is attached is accommodated. In addition, a drive motor (servo motor) for rotationally driving the rotary shaft (rotary table) is attached to the frame. Further, the drive motor and the rotary shaft are connected to each other via a drive transmission mechanism configured to transmit rotation of the drive motor to the rotary shaft, and the drive transmission mechanism is also accommodated in the space in the frame described above.

Note that, the transmission mechanism includes a gear mechanism such as a worm and a worm wheel. Lubricating oil for lubricating the gear mechanism is stored in a part of the space corresponding to the gear mechanism. In other words, the space includes a storage part in which the lubricating oil for lubricating the gear mechanism is stored.

In such a machine tool, an amount of lubricating oil (oil amount) in the storage part of the rotation indexing device may change. Specifically, in the storage part, the oil amount may decrease due to leakage or the like, or the oil amount may increase due to inflow of a coolant liquid. When the oil amount decreases, the gear mechanism becomes in a state where lubrication is insufficient. In addition, when the oil amount increases, the lubricating oil is in a state where the coolant liquid flowing into the storage part is mixed and lubricating performance thereof is deteriorated. In any case, the gear mechanism wears as it operates, so that the accuracy of an angular position of a workpiece indexed by the rotation indexing device decreases.

For this reason, in such a machine tool, it is necessary for an operator to manage the oil amount. Therefore, a general rotation indexing device has, as a configuration for managing the oil amount, a direct-view type oil gauge provided so that an operator can visually check a height position of an oil level in the storage part. Note that, the oil gauge is, of course, provided so that it can be checked from an outside at a position corresponding to the storage part in the frame.

CITATION LIST

Patent Literature

PTL 1: JP2020-44614A

In the meantime, in the machine tool including the rotation indexing device of the related art, the rotation indexing device is provided in a machining area of the machine tool where the workpiece is machined. For this reason, in many cases, the rotation indexing device is in a state where dirt is attached to a surface of the rotation indexing device due to the coolant liquid and cutting chips scattered in the machining area as the workpiece is machined.

In that case, in the case of the oil gauge provided as described above for managing (checking) the oil amount, the oil amount (height position of the oil level) may not be checked, as it is, due to the dirt attached to the surface of the rotation indexing device as described above. If the oil amount cannot be checked due to the dirt, it is necessary for the operator to perform a cleaning operation to remove the dirt attached around the oil gauge for the checking.

As described above, in the machine tool including the rotation indexing device of the related art, the oil amount is managed by checking the oil amount by using the oil gauge that may be accompanied by the cleaning operation as described above. Therefore, there is a problem that a large burden may be placed on the operator in the management.

SUMMARY

The present invention has been made in view of the above situations, and an object thereof is to provide a machine tool including a rotation indexing device capable of reducing a burden on an operator in managing an oil amount in a storage unit, as described above.

A preamble of the present invention is a machine tool including a rotation indexing device for indexing an angular position of a rotation target member attached to an end portion of a rotary shaft, particularly the rotation indexing device including a frame configured to accommodate the rotary shaft in a state of rotatably supporting the rotary shaft, a drive motor configured to rotationally drive the rotary shaft, and a drive transmission mechanism accommodated in a space inside the frame and configured to transmit rotation of an output shaft of the drive motor to the rotary shaft, wherein the drive transmission mechanism includes a gear mechanism and the space includes one or more storage parts for storing lubricating oil for lubricating the gear mechanism.

In addition, the present invention is characterized in that the machine tool includes a detection device for detecting a height position of an oil level of the lubricating oil stored in the storage part, and in that the detection device is provided on a one-to-one basis with respect to a detection target storage part, which is set as a detection target, of the one or more storage parts.

In addition, the machine tool according to the present invention may include a display device connected to the detection device and configured to display information regarding the height position detected by the detection device.

In addition, the display device may be provided on an outside of a cover configured to cover a machining area where the rotation indexing device is arranged and a workpiece is machined.

According to the present invention, in the machine tool including the rotation indexing device as described above, which is the preamble of the present invention, the detection device configured to detect the height position of the oil level in the detection target storage part is provided in a form of being provided on a one-to-one basis with respect to the detection target storage part of the rotation indexing device. Thereby, by setting a storage part for which oil amount management is required as the detection target storage part, the oil amount management in the detection target storage part can be performed using a detection result regarding the height position of the oil level by the detection device. Therefore, according to the present invention configured as described above, the burden for the cleaning operation as described above is not placed on the operator and a burden that is placed on the operator in managing the oil amount can be reduced, as compared to the machine tool including the rotation indexing device of the related art, in which the oil amount is managed using the oil gauge.

In addition, the machine tool according to the present invention is provided with the display device configured to display the information regarding the height position of the oil level detected by the detection device, so that the operator can visually check the information displayed on the display device. As a result, the operator can perceive the information regarding the height position of the oil level. Thereby, the oil amount is managed while the operator perceives a state of the oil amount, so that the oil amount can be managed more appropriately.

Further, in the machine tool according to the present invention, the display device is provided on the outside of the cover configured to cover the machining area where the rotation indexing device is arranged and a workpiece is machined. This allows visual check on the display device to be performed on an outside with respect to the cover. Therefore, the check on the information (display) regarding the oil amount as described above performed for management of the oil amount can be performed more easily.

DESCRIPTION OF EMBODIMENTS

Figure 1:
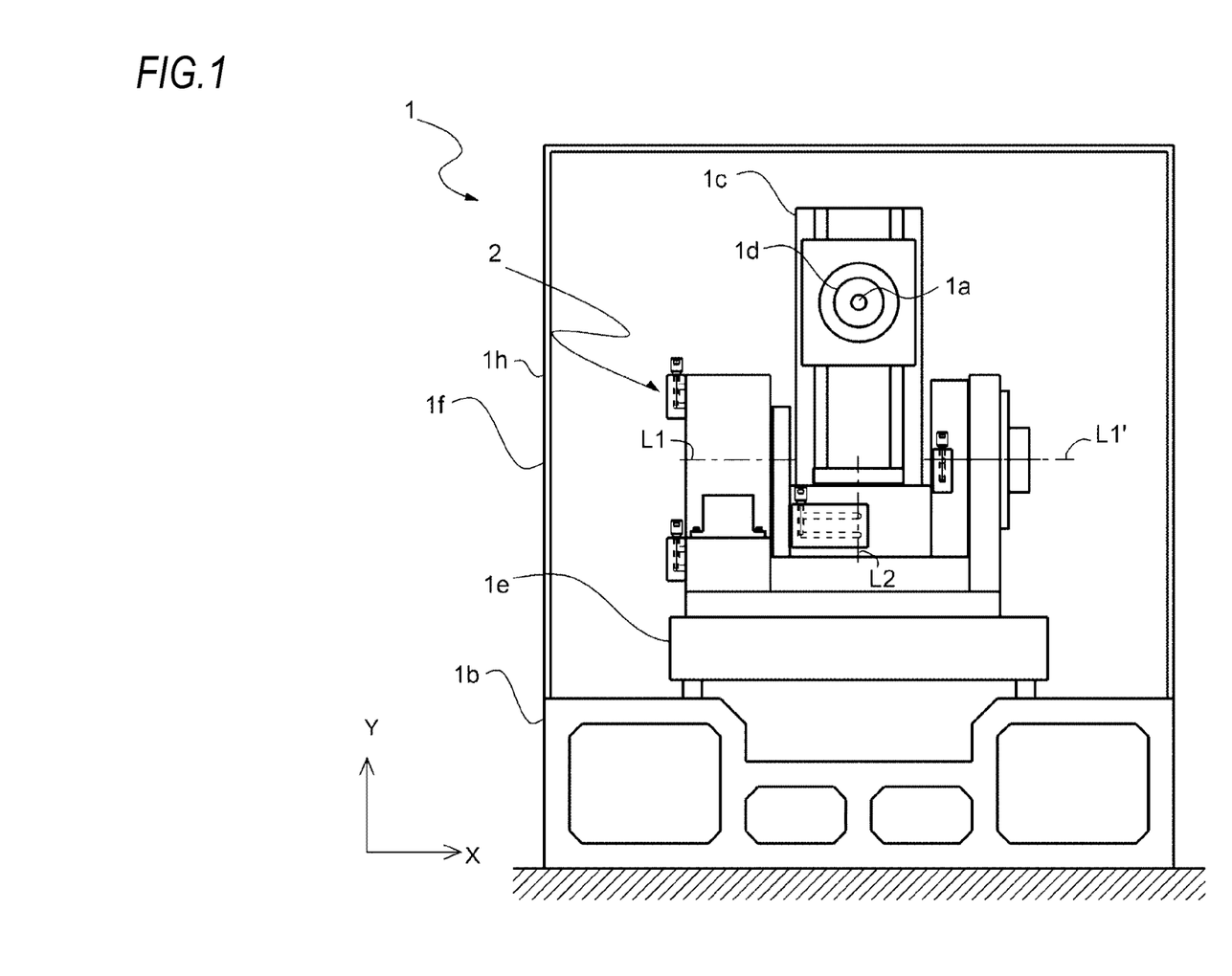
FIG. 1 is a front view showing one embodiment of a machine tool to which the present invention is applied.

Hereinafter, one embodiment of a machine tool 1 to which the present invention is applied will be described with reference to FIGS. 1 to 6. Note that, as shown in FIG. 1, the machine tool 1 of the present embodiment is a machine tool 1 (so-called horizontal machining center) in which a direction of a rotation axis line of a main shaft 1a is parallel to a horizontal direction. In addition, the machine tool 1 includes a bed 1b that is a base, a column 1c supported so as to be movable in a horizontal direction (X-axis direction) with respect to the bed 1b, a main shaft head 1d supported so as to be movable in a vertical direction (Y-axis direction) with respect to the column 1c, and a table 1e provided on the bed 1b so as to be movable in a direction (Z-axis direction) orthogonal to the X-axis direction and the Y-axis direction. Note that, the machine tool 1 of the present embodiment has a housing-shaped exterior cover 1f. The exterior cover 1f is attached to the bed 1b in a form of covering an area above the bed 1b including a machining area where a workpiece is machined in the machine tool 1.

In addition, the machine tool 1 has a tilting circular table device 2 for indexing an angular position of a workpiece. More specifically, as shown in FIG. 2, the machine tool 1 of the present embodiment has a tilting circular table device 2 including two types of rotation indexing devices 3 and 4 of a rotation indexing device (tilting drive unit) 3 configured to index an angular position of a rotary table 7 on which a workpiece is placed around an axis line L1 in the horizontal direction and a rotation indexing device (rotation drive unit) 4 configured to index an angular position of the rotary table 7 on which the workpiece is placed around an axis line L2 of a support shaft 17 is configured to support the rotary table 7.

The tilting circular table device 2 is provided in a form of being placed on the table 1e of the machine tool 1. The tilting circular table device 2 includes a base frame 5 placed on the table 1e of the machine tool 1, a tilt frame 6 supported by the base frame 5, and the rotary table 7 installed on the tilt frame 6 and configured to place a workpiece thereon. The base frame 5 and the tilt frame 6 are frames of the tilting circular table device 2 including the two types of rotation indexing devices 3 and 4 of the present embodiment, and correspond to the frame of the present invention.

The base frame 5 is constituted by a plate-shaped pedestal 5a that is a base, and a pair of support members 5b and 5c erected on the pedestal 5a with being separated from each other in a longitudinal direction of the pedestal 5a. In addition, as shown in FIGS. 4 and 5, in the base frame 5, rotary shafts 8 and 9 are rotatably supported by the pair of support members 5b and 5c, respectively, via bearings B1 and B2.

Figure 2:
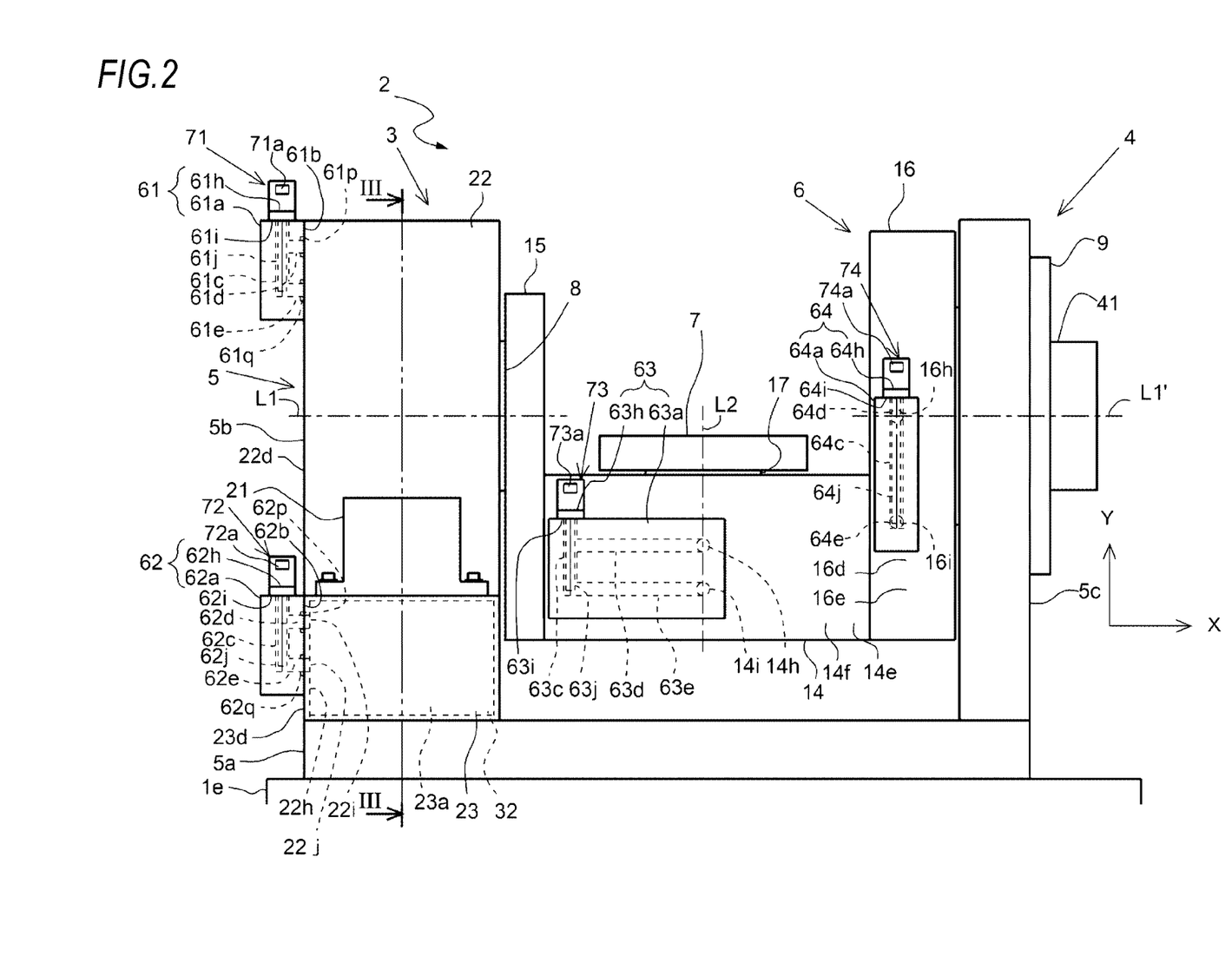
FIG. 2 is a front view showing a tilting circular table device of the machine tool in FIG. 1.

Further, as shown in FIG. 2, the tilt frame 6 is a so-called cradle type support frame, and is constituted by a tilt table 14 on which the rotary table 7 is installed and a pair of arm parts 15 and 16 for supporting the tilt table 14.

Figure 4:
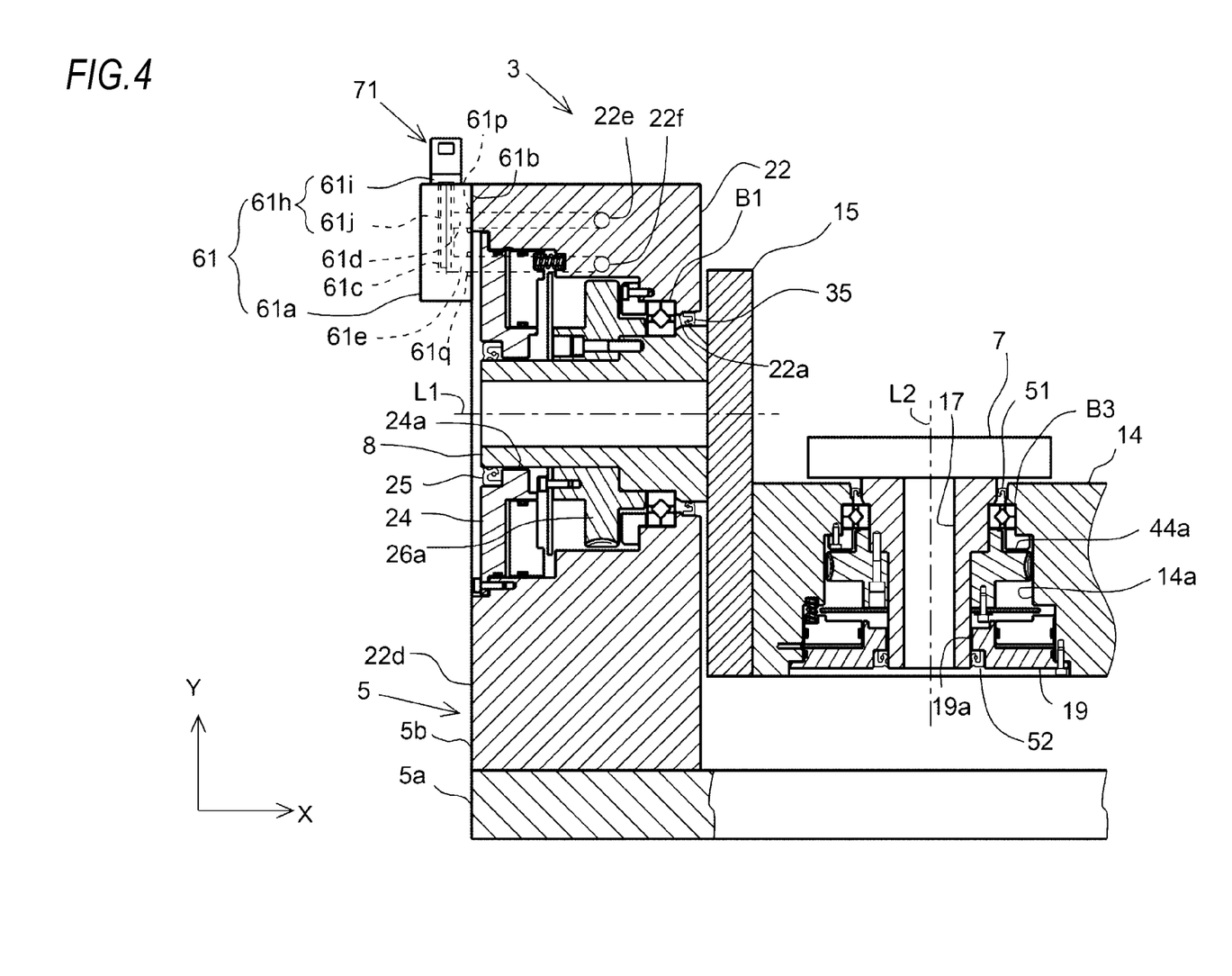
FIG. 4 is a front view of the tilting circular table device of FIG. 1, mostly showing a cross-sectional view taken along a IV-IV line of FIG. 3.
Figure 5:
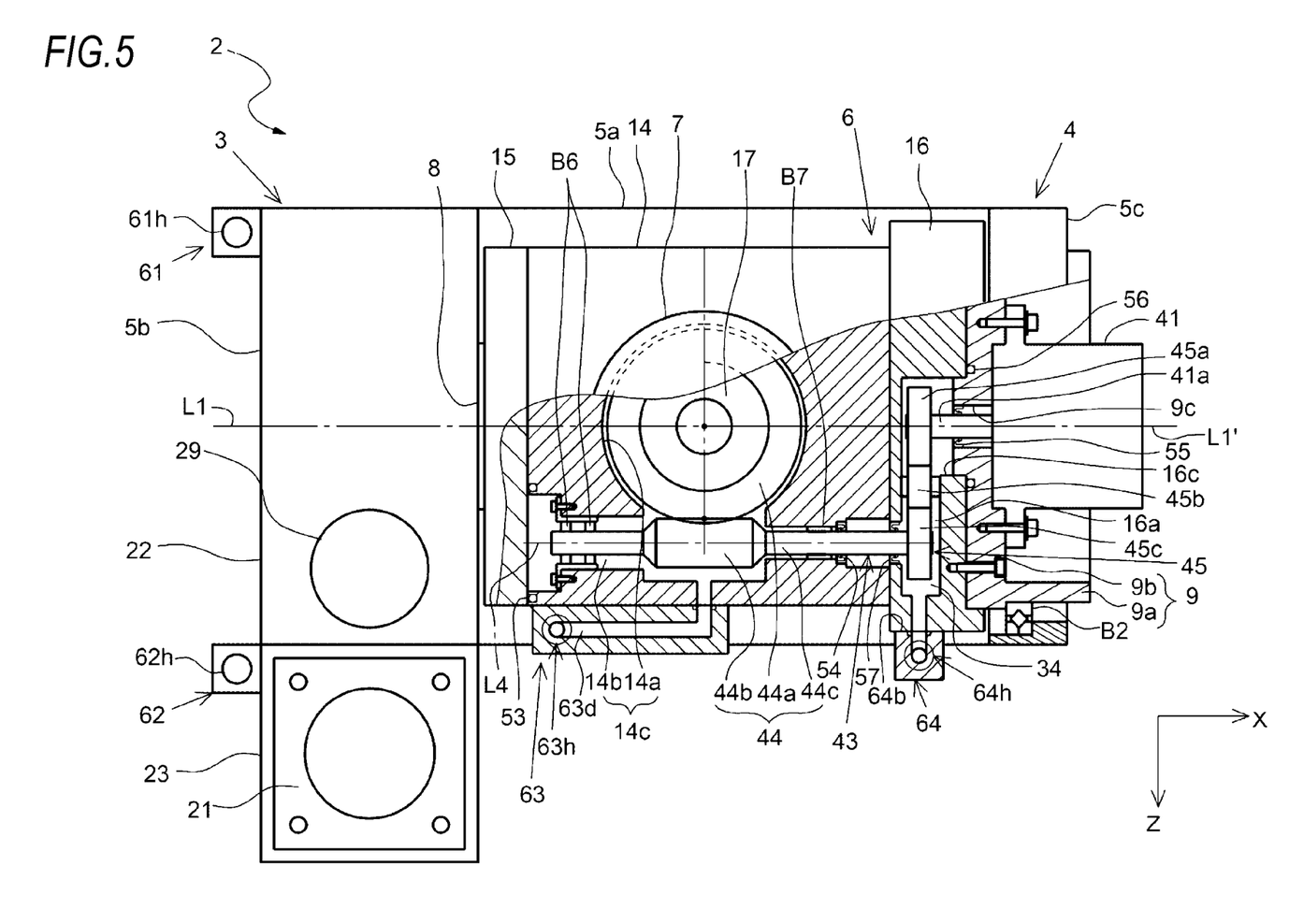
FIG. 5 is a plan view of the tilting circular table device, partially showing a cross-sectional view.

Note that, as shown in FIGS. 4 and 5, the tilt table 14 is formed into a housing shape having a plate shape in appearance and a rectangular shape when seen in a plate thickness direction and having a space therein. The respective arm parts 15 and 16 are fixed to the corresponding rotary shafts 8 and 9 between the pair of support members 5b and 5c (between the pair of rotary shafts 8 and 9) of the base frame 5, so that the tilt frame 6 is supported by the base frame 5 via the pair of rotary shafts 8 and 9.

Further, the tilt table 14 of the tilt frame 6 is provided with a support shaft 17 in a direction in which the direction of the axis line L2 coincides with the plate thickness direction of the tilt table 14. More specifically, the tilt table 14 is formed at a central portion with an accommodation hole (hereinafter, also referred to as 'accommodation hole for a support shaft') 14a for accommodating the support shaft 17. The support shaft 17 is accommodated in the accommodation hole 14a for a support shaft in a direction in which the direction of the axis line L2 coincides with the plate thickness direction. However, the support shaft 17 is rotatably supported by the tilt table 14 via a bearing B3 in such an arrangement that one end portion thereof in the plate thickness direction protrudes from an upper surface of the tilt table 14.

Note that, the accommodation hole 14a for a support shaft is provided with a disk-shaped back side cover 19 on an opposite side, in the plate thickness direction, to a side on which the support shaft 17 protrudes. The back side cover 19 is formed with a through-hole 19a in a substantial center of the disk shape. In addition, the through-hole 19a is a hole whose inner diameter is larger than an outer diameter of the other end portion of the support shaft 17. The back side cover 19 is attached to the tilt table 14 in such a form that the other end portion of the support shaft 17 is fitted in the through-hole 19a.

The rotary table 7 is attached to one end of the support shaft 17. The rotary table 7 is a disk-shaped member, and is provided in a state where a center thereof coincides with the axis line L2 of the support shaft 17. The rotary table 7 is attached to the support shaft 17 in this way, so that the rotary table 7 is in a state of being rotatably supported with respect to the tilt table 14.

In addition, as shown in FIG. 2, the tilting circular table device 2 includes a tilting drive unit 3 for swingably driving the tilt frame 6, and a rotation drive unit 4 for rotationally driving the rotary table 7.

The tilting drive unit 3 is provided to rotationally drive a rotary shaft (hereinafter, also referred to as 'tilting drive shaft') 8 rotatably supported in the drive support member 5b that is one support member (hereinafter, also referred to as 'drive support member') of the pair of support members 5b and 5c of the base frame 5. For this reason, the tilting drive unit 3 has a tilting drive motor 21 as a drive source for rotationally driving the tilting drive shaft 8. The tilting drive motor 21 of the present embodiment corresponds to the drive motor of the present invention.

Further, the tilting drive shaft 8 that is rotationally driven by the tilting drive motor 21 is configured to support the tilt frame 6 whose angular position is indexed by the tilting drive unit 3. Therefore, the tilting drive shaft 8 and the drive support member 5b to which the tilting drive motor 21 is attached and which supports the tilting drive shaft 8 are also configured as a part of the tilting drive unit 3. As for the tilting drive unit 3, the tilt frame 6 which is attached to the tilting drive shaft 8 and whose angular position is indexed around the axis line L1 of the tilting drive shaft 8 corresponds to the rotation target member 6 of the rotation indexing device 3.

Figure 3:
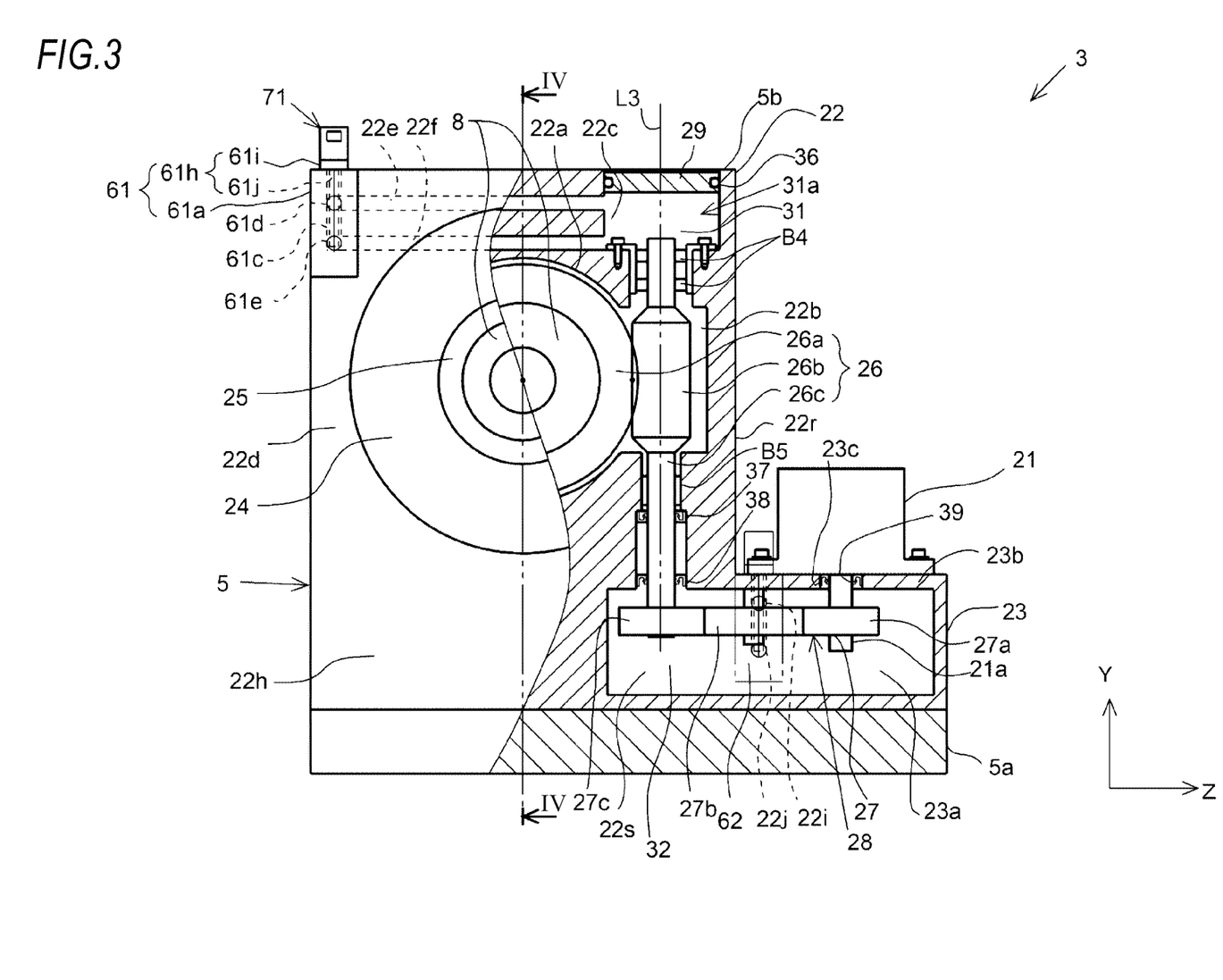
FIG. 3 is a left side view of the tilting circular table device of FIG. 1, partially showing a cross-sectional view taken along a III-III line of FIG. 2.

As for the tilting drive unit 3, specifically, as shown in FIGS. 3 and 4, the drive support member 5b is constituted by a frame body part 22 that is a part by which the tilting drive shaft 8 is rotatably supported and is a main part, and a motor attaching part 23 to which the tilting drive motor 21 as a drive source is attached.

More specifically, as for the drive support member 5b, the frame body part 22 has a substantially cuboid shape in appearance. The tilting drive shaft 8 is provided with respect to the frame body part 22 in a form of bridging over both side surfaces of the frame body part 22 in a thickness direction (X-axis direction). Therefore, the frame body part 22 has an accommodation hole (hereinafter, also referred to as 'accommodation hole for a tilt shaft') 22a formed to penetrate in the thickness direction, as a space for accommodating the tilting drive shaft 8. The tilting drive shaft 8 is supported with respect to the frame body part 22 via the bearing B1 in such an arrangement that one end portion thereof slightly protrudes from the frame body part 22.

Note that, the accommodation hole 22a for a tilt shaft is provided with a disk-shaped back side cover 24 on an opposite side, in the thickness direction, to a side on which the tilting drive shaft 8 protrudes. The back side cover 24 is formed with a through-hole 24a at a substantial center of the disk shape. In addition, the through-hole 24a is a hole whose inner diameter is larger than an outer diameter of the other end portion of the tilting drive shaft 8. The back side cover 24 is attached to the frame body part 22 in such a form that the other end portion of the tilting drive shaft 8 is fitted in the through-hole 24a.

Further, as shown in FIG. 3, the motor attaching part 23 is likewise formed in a substantially cuboid shape in appearance, and is formed integrally with the frame body part 22 in a form of protruding from a front side surface 22r of front and rear surfaces (which are substantially orthogonal to both the side surfaces) parallel to the thickness direction of the frame body part 22. Note that, the motor attaching part 23 has a housing shape having a space 23a therein (hereinafter, also referred to as 'internal space'). A height dimension of the motor attaching part 23 is smaller than a height dimension of the frame body part 22, and is about ¼ in the illustrated example.

In addition, the tilting drive motor 21 is attached to an upper surface of the motor attaching part 23 with an output shaft 21a thereof facing downward. Therefore, the tilting drive motor 21 has such a form that a tip end of the output shaft 21a enters the internal space 23a in a state of being attached to the motor attaching part 23 in this way. For this reason, an upper wall portion 23b including the upper surface of the motor attaching part 23 is formed with a through-hole 23c through which the output shaft 21a passes.

Further, the tilting drive unit 3 includes a worm mechanism 26 connected to the tilting drive shaft 8, and a gear train 27 including a transmission gear 27b for transmitting rotation of the output shaft 21a of the tilting drive motor 21 to the worm mechanism 26. That is, the tilting drive unit 3 is configured such that a drive transmission mechanism 28 for transmitting rotation of the output shaft 21a of the tilting drive motor 21, which is a drive source, to the tilting drive shaft 8 has two gear mechanisms 26 and 27 of the worm mechanism 26 and the gear train 27.

Among them, the worm mechanism 26 is constituted by a worm wheel 26a attached to the tilting drive shaft 8 and a worm shaft 26c having a worm 26b connected to the worm wheel 26a.

Note that, since the worm wheel 26a is attached to the tilting drive shaft 8 as described above, it is accommodated in the accommodation hole 22a for a tilt shaft described above.

Further, in the illustrated example, the worm shaft 26c is provided to extend from a position above the worm wheel 26a to a position of the motor attaching part 23 with respect to the vertical direction, in a state where an axis line L3 is directed in the vertical direction of the frame body part 22.

For this reason, the frame body part 22 is formed with a hole (hereinafter, also referred to as 'accommodation hole 22b for a worm shaft') for accommodating the worm shaft 26c provided in this way. The accommodation hole 22b for a worm shaft is formed to communicate with the accommodation hole 22a for a tilt shaft in which the worm wheel 26a is accommodated. In addition, the accommodation hole 22b for a worm shaft is formed to communicate with the internal space 23a of the motor attaching part 23 described above, in the frame body part 22. Further, the accommodation hole 22b for a worm shaft is formed as a hole opening to the upper surface of the frame body part 22 so that the worm shaft 26c can be inserted from an outside of the frame body part 22. Further, a portion of the accommodation hole 22b for a worm shaft, which opens to the upper surface of the frame body part 22, is provided with a disk-shaped cover member 29 in a form of being fitted to an inner peripheral surface of the hole.

Further, the worm shaft 26c has the worm 26b described above at an intermediate position in the direction of the axis line L3. The worm shaft 26c is supported with respect to the frame body part 22 via bearings B4 and B5 provided on both sides in the vertical direction with respect to the worm 26b in such an arrangement that the worm 26b meshes with the worm wheel 26a with respect to the vertical direction in the accommodation hole 22b for a worm shaft.

Further, the worm shaft 26c is connected to the output shaft 21a of the tilting drive motor 21 via the gear train 27. More specifically, a drive gear 27a is fixed to the output shaft 21a of the tilting drive motor 21 attached to the drive support member 5b (motor attaching part 23) as described above, at apart located in the internal space 23a. On the other hand, a driven gear 27c is fixed to a lower end portion of the worm shaft 26c provided in the frame body part 22 as described above. The driven gear 27c and the drive gear 27a are connected to each other in the internal space 23a via one or more transmission gears 27b.

Note that, since the driven gear 27c is attached to the worm shaft 26c as described above, it is accommodated in the accommodation hole 22b for a worm shaft described above. The rotation of the output shaft 21a of the tilting drive motor 21 is transmitted to the worm mechanism 26 by the gear train 27 including the drive gear 27a, the transmission gear 27b, and the driven gear 27c.

In this way, the tilting drive unit 3 is configured such that the rotation of the output shaft 21a of the tilting drive motor 21, which is a drive source, is transmitted to the tilting drive shaft 8 by the drive transmission mechanism 28 including the gear train 27 and the worm mechanism 26, and therefore, the drive shaft 8 is rotationally driven. Thereby, the tilting drive unit 3 is configured to swingably drive the tilt frame 6 supported by the tilting drive shaft 8.

Further, in the space inside the drive support member 5b of the tilting drive unit 3, storage parts 31 and 32, which correspond to the respective gear mechanisms 26 and 27 and are provided to store lubricating oil for lubricating the corresponding gear mechanisms 26 and 27, are provided. The storage part 31, which corresponds to the worm mechanism 26, of the storage parts is provided in a space (hereinafter, also referred to as 'body part-side space') 31a constituted by the accommodation hole 22a for a tilt shaft and the accommodation hole 22b for a worm shaft.

More specifically, as shown in FIG. 4, an oil seal 35 is provided in the accommodation hole 22a for a tilt shaft in a form of being interposed between an inner peripheral surface of the accommodation hole 22a for a tilt shaft and an outer peripheral surface of the tilting drive shaft 8, on the side where the tilting drive shaft 8 protrudes. Further, an oil seal 25 is provided in the accommodation hole 22a for a tilt shaft in a form of being interposed between an inner peripheral surface of the through-hole 24a of the back side cover 24 and the outer peripheral surface of the tilting drive shaft 8, on the side where the back side cover 24 is provided. Therefore, the accommodation hole 22a for a tilt shaft is in a state where portions configured to communicate with an outside of the frame body part 22 on both sides in the direction of the axis line L1 of the tilting drive shaft 8 are sealed.

In addition, as shown in FIG. 3, an O-ring 36 is provided in the accommodation hole 22b for a worm shaft of the body part-side space 31a in a form of being interposed between an outer peripheral surface of the cover member 29 and an inner peripheral surface of the accommodation hole 22b for a worm shaft, on an upper side in the direction of the axis line L3 of the worm shaft 26c. Therefore, the accommodation hole 22b for a worm shaft is in a state where a portion configured to communicate with an outside of the frame body part 22 on the upper side in the direction of the axis line L3 of the worm shaft 26c is sealed.

Thereby, the body part-side space 31a constituted by the accommodation hole 22a for a tilt shaft and the accommodation hole 22b for a worm shaft is in a state in which each portion configured to communicate with an outside is sealed. In addition, a first seal member 37 that is an oil seal is provided in the body part-side space 31a in a form of being interposed between an inner peripheral surface of the accommodation hole 22b for a worm shaft and an outer peripheral surface of the worm shaft 26c, at a position below the lower bearing B5 of the upper and lower bearings B4 and B5 configured to support the worm 26b in the accommodation hole 22b for a worm shaft. Thereby, the body part-side space 31a is in a state where a part above the first seal member 37 is partitioned with respect to a space below the first seal member 37 in the accommodation hole 22b for a worm shaft.

The lubricating oil for lubricating the worm mechanism 26 is stored in the upper part of the body part-side space 31a. Therefore, the upper part is the storage part (first storage part) 31 corresponding to the worm mechanism 26.

In addition, a storage part 32 corresponding to the gear train 27 configured to connect the output shaft 21a of the tilting drive motor 21 and the worm shaft 26c each other is provided in a space constituted by the internal space 23a of the motor attaching part 23 and the accommodation hole 22b for a worm shaft configured to communicate with the internal space 23a.

More specifically, a second seal member 38 that is an oil seal is provided in the accommodation hole 22b for a worm shaft in a form of being interposed between the inner peripheral surface of the accommodation hole 22b for a worm shaft and the outer peripheral surface of the worm shaft 26c, below the position where the first seal member 37 is provided. Therefore, the accommodation hole 22b for a worm shaft is formed such that a space (lower space) 22s below the second seal member 38 is partitioned from a space above the lower space also by the second seal member 38.

Note that, the driven gear 27c described above is attached to the worm shaft 26c at an end portion located below the position where the second seal member 38 is provided. In addition, the motor attaching part 23 is provided with an oil seal 39 in a form of being interposed between an inner peripheral surface of the through-hole 23c through which the output shaft 21a of the tilting drive motor 21 penetrates and an outer peripheral surface of the output shaft 21a. Therefore, the internal space 23a of the motor attaching part 23 is in a state where the part configured to communicate with an outside is sealed.

The internal space 23a of the motor attaching part 23 and the lower space 22s of the accommodation hole 22b for a worm shaft communicate with each other to form one space, the gear train 27 described above is formed in the one space, and the space for accommodating the gear train 27 is sealed by the oil seal 39 around the output shaft 21*a* and the second seal member 38. In addition, the lubricating oil for lubricating the gear train 27 is stored in the space for accommodating the gear train 27. Therefore, the space is the storage part (second storage part) 32 corresponding to the gear train 27.

Further, as shown in FIGS. 2 and 5, the rotation drive unit 4 is provided to rotationally drive the support shaft 17 rotatably supported by the tilt table 14 and the rotary table 7 attached to the support shaft 17. For this reason, the rotation drive unit 4 has a rotation drive motor 41 as a drive source for rotationally driving the support shaft 17. The rotation drive motor 41 of the present embodiment corresponds to the drive motor in the present invention.

Note that, in the present embodiment, the rotation drive motor 41 is provided in a form of being supported by the other support member (hereinafter, also referred to as 'driven support member') 5*c* of the pair of support members 5*b* and 5*c* of the base frame 5. However, in the tilting circular table device 2, since the support shaft 17 that is rotationally driven by the rotation drive motor 41 is supported by the tilt frame 6 (tilt table 14) that is swingably driven as described above, the rotation drive motor 41 is provided in a form of being attached to a rotary shaft (hereinafter, also referred to as a 'driven shaft') 9 rotatably supported with respect to the driven support member 5*c*. That is, the rotation drive motor 41 is supported by the driven support member 5*c* via the driven shaft 9. Therefore, the driven support member 5*c* and the driven shaft 9 are configured as a part of the rotation drive unit 4.

Further, the support shaft 17 that is driven by the rotation drive motor 41 is rotatably supported by the tilt table 14 of the tilt frame 6, and is connected to the rotation drive motor 41 by a drive transmission mechanism 43 provided in the tilt frame 6 as described later.

Therefore, the support shaft 17 and the tilt frame 6 are also configured as a part of the rotation drive unit 4. As for the rotation drive unit 4, the rotary table 7 which is attached to the support shaft 17 and whose angular position is indexed around the axis line L2 of the support shaft 17 corresponds to a rotation target member 7 in the rotation indexing device 4.

Figure 6:
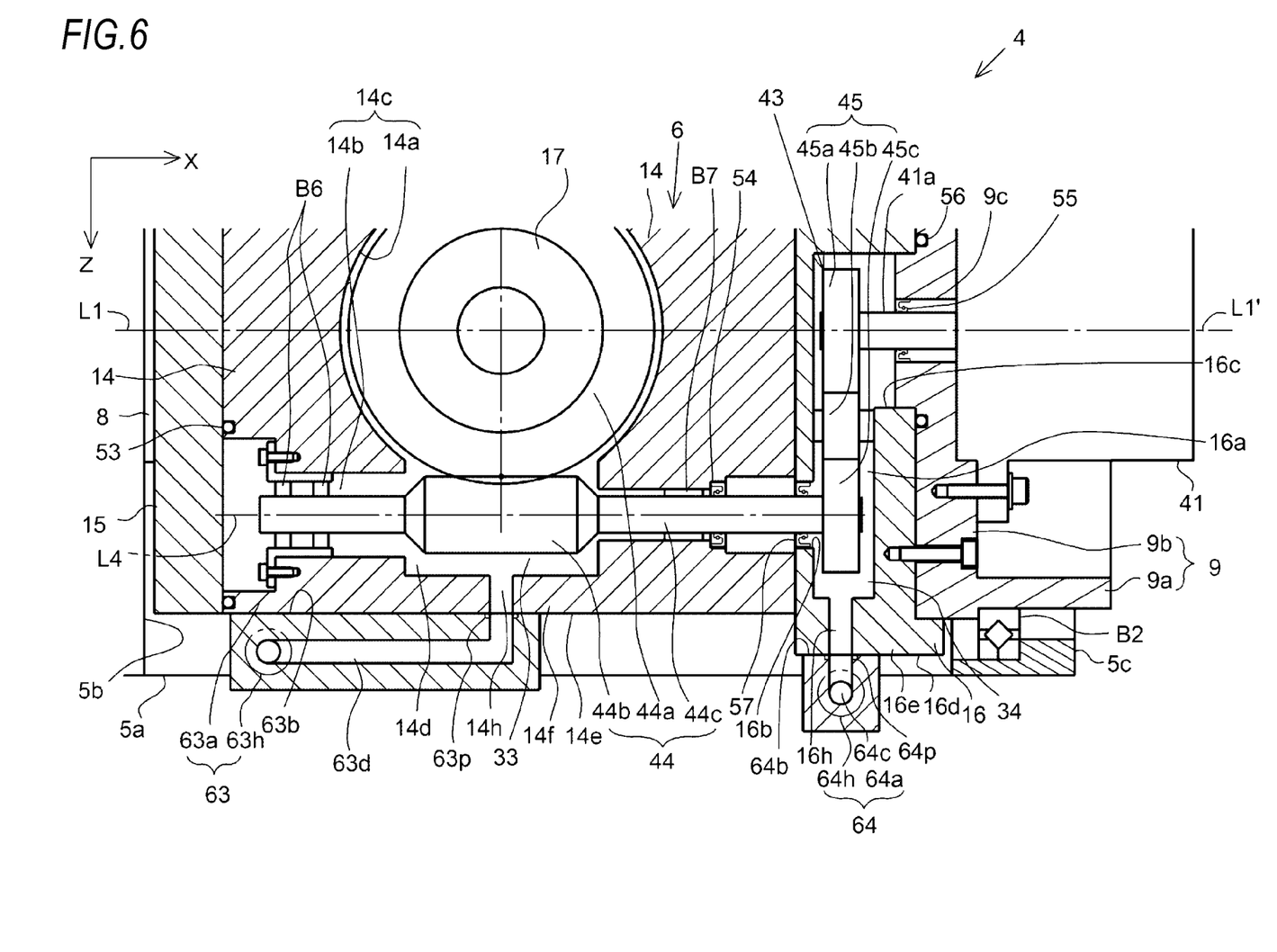
FIG. 6 is a cross-sectional view showing a state where the tilting circular table device is cut in a horizontal direction.

As for the rotation drive unit 4, specifically, as shown in FIGS. 5 and 6, the driven shaft 9 has such a configuration that a shaft portion 9*a* formed in a hollow cylindrical shape and a wall portion 9*b* provided on one end-side of the shaft portion 9*a* are integrally formed. However, the wall portion 9*b* is formed in a form of closing the shaft portion 9*a* on one end-side thereof. Note that, an inner diameter of the hollow cylindrical shaft portion 9*a* is large enough to accommodate the rotation drive motor 41. Further, the wall portion 9*b* is formed with a through-hole 9*c* having a size capable of inserting an output shaft 41*a* of the rotation drive motor 41, at a substantial center of the wall portion 9*b*. The driven shaft 9 is supported with respect to the driven support member 5*c* via the bearing B2, in a direction in which the one end-side is located on the tilting drive shaft 8-side with respect to a direction of an axis line L' and at a position where a shaft center coincides with a shaft center of the tilting drive shaft 8 when seen in the direction of the axis line L1'.

In addition, the rotation drive motor 41 is partially accommodated in the shaft portion 9*a* of the driven shaft 9, and is attached to the driven shaft 9 in a direction in which the output shaft 41*a* is directed toward the tilting drive shaft 8. Note that, in the attached state, the output shaft 41*a* of the rotation drive motor 41 is in a state of penetrating through the through-hole 9*c* of the wall portion 9*b* of the driven shaft 9 and protruding from the driven shaft 9 (wall portion 9*b*) toward the tilting drive shaft 8.

Further, the rotation drive unit 4 includes a worm mechanism 44 connected to the support shaft 17, and a gear train 45 including a transmission gear 45*b* for transmitting rotation of the output shaft 41*a* of the rotation drive motor 41 to the worm mechanism 44. That is, the rotation drive unit 4 is configured such that the drive transmission mechanism 43 for transmitting rotation of the output shaft 41*a* of the rotation drive motor 41, which is a drive source, to the support shaft 17 is constituted by the two gear mechanisms 44 and 45 of the worm mechanism 44 and the gear train 45.

Among them, the worm mechanism 44 is constituted by a worm wheel 44*a* attached to the support shaft 17 and a rotation drive shaft 44*c* having a worm 44*b* connected to the worm wheel 44*a*.

Note that, as shown in FIG. 4, since the worm wheel 44*a* is attached to the support shaft 17 as described above, it is accommodated in the accommodation hole 14*a* for a support shaft described above. In addition, as shown in FIGS. 5 and 6, the rotation drive shaft 44*c* is provided in the tilt table 14 of the tilt frame 6 in such an arrangement that an axis line L4 thereof is directed toward a direction parallel to the axis line L1' of the driven shaft 9 and the worm 44*b* meshes with the worm wheel 44*a*.

For this reason, the tilt table 14 is formed with a hole (accommodation hole for a rotary shaft) 14*b* in which the rotation drive shaft 44*c* provided as such is accommodated, which is an accommodation hole 14*b* for a rotary shaft configured to communicate with the accommodation hole 14*a* for a support shaft in which the worm wheel 44*a* is accommodated. The rotation drive shaft 44*c* is supported with respect to the tilt table 14 via bearings B6 and B7 each provided on both sides in the direction of the axis line L4 of the worm 44*b*, in the accommodation hole 14*b* for a rotary shaft. Further, the rotation drive shaft 44*c* is connected to the output shaft 41*a* of the rotation drive motor 41 via the gear train 45.

More specifically, the accommodation hole 14*b* for a rotary shaft in which the rotation drive shaft 44*c* is accommodated is formed to open to side surfaces of the tilt table 14 on both sides in the direction of the axis line L4 of the rotation drive shaft 44*c*. Both side surfaces of the tilt table 14 are side surfaces to which the pair of arm parts 15 and 16 of the tilt frame 6 are respectively attached. Therefore, one end-side in the direction of the axis line L4 of the rotation drive shaft 44*c* becomes the tilting drive shaft 8-side, and the other end-side becomes the driven shaft 9-side. The accommodation hole 14*b* for a rotary shaft is closed on the tilting drive shaft 8-side by the arm part 15 on the tilting drive shaft 8-side.

On the other hand, the arm part 16 on the driven shaft 9-side is formed with a space (space 16*a* for a gear train) extending from the accommodation hole 14*b* for a rotary shaft of the tilt table 14 to the through-hole 9*c* of the driven shaft 9. In addition, as shown in FIG. 6, the arm part 16 on the driven shaft 9-side is formed with a through-hole 16*b* opening toward the accommodation hole 14*b* for a rotary shaft of the tilt table 14. Therefore, the accommodation hole 14*b* for a rotary shaft is configured to communicate with the space 16*a* for a gear train via the through-hole 16*b*, on the driven shaft 9-side.

Further, an end portion of the rotation drive shaft 44*c* on the other end-side is in a state of being located in the space 16*a* for a gear train. Furthermore, the arm part 16 on the driven shaft 9-side is also formed with a through-hole 16*c* opening toward the through-hole 9c of the driven shaft 9. Therefore, a tip end portion of the output shaft 41a of the rotation drive motor 41 protruding from the driven shaft 9 as described above is also in a state of being located in the space 16a for a gear train.

A drive gear 45a is fixed to the output shaft 41a of the rotation drive motor 41 at a part located in the space 16a for a gear train. In addition, a driven gear 45c is fixed to the rotation drive shaft 44c at a part located in the space 16a for a gear train. Further, the driven gear 45c and the drive gear 45a are connected to each other in the space 16a for a gear train via one or more transmission gears 45b. The rotation of the output shaft 41a of the rotation drive motor 41 is transmitted to the worm mechanism 44 by the gear train 45 including the drive gear 45a, the transmission gear 45b, and the driven gear 45c.

In this way, the rotation drive unit 4 is configured such that the rotation of the output shaft 41a of the rotation drive motor 41, which is a drive source, is transmitted to the support shaft 17 by the drive transmission mechanism 43 including the gear train 45 and the worm mechanism 44, and therefore, the support shaft 17 is rotationally driven. Thereby, the rotation drive unit 4 is configured to rotationally drive the rotary table 7 supported by the support shaft 17.

Further, in the space inside the tilt frame 6 of the tilting drive unit 4, storage parts 33 and 34, which correspond to the respective gear mechanisms 44 and 45 and are provided to store lubricating oil for lubricating the corresponding gear mechanisms 44 and 45, are provided.

The storage part 33, which corresponds to the worm mechanism 44, of the storage parts is provided in a space (hereinafter, also referred to as 'tilt table-side space') 14c constituted by the accommodation hole 14a for a support shaft and the accommodation hole 14b for a rotary shaft.

More specifically, as shown in FIG. 4, an oil seal 51 is provided in the accommodation hole 14a for a support shaft in a form of being interposed between an inner peripheral surface of the accommodation hole 14a for a support shaft and an outer peripheral surface of the support shaft 17, on the side where the support shaft 17 protrudes. Further, an oil seal 52 is provided in the accommodation hole 14a for a support shaft in a form of being interposed between an inner peripheral surface of the through-hole 19a of the back side cover 19 and the outer peripheral surface of the support shaft 17, on the side where the back side cover 19 is provided. Therefore, the accommodation hole 14a for a support shaft is in a state where portions configured to communicate with an outside of the tilt table 14 on both sides in the direction of the axis line L2 of the support shaft 17 are sealed.

Further, as shown in FIG. 6, the accommodation hole 14b for a rotary shaft is in a state where the portion opening toward the tilting drive shaft 8-side as described above is closed by the arm part 15 on the tilting drive shaft 8-side. Note that, an O-ring 53 is interposed between a periphery of the opening of the accommodation hole 14b for a rotary shaft in the side surface of the tilting drive shaft 8 and the arm part 15 on the tilting drive shaft 8-side. Thereby, the tilt table-side space 14c constituted by the accommodation hole 14a for a support shaft and the accommodation hole 14b for a rotary shaft is in a state where each portion configured to communicate with an outside is sealed.

In addition, a third seal member 54 that is an oil seal is provided in the accommodation hole 14b for a rotary shaft of the tilt table-side space 14c in a form of being interposed between an inner peripheral surface of the accommodation hole 14b for a rotary shaft and an outer peripheral surface of the rotation drive shaft 44c, on the further driven shaft 9-side of the rotation drive shaft 44c than the worm 44b. However, the third seal member 54 is provided on the driven shaft 9-side than the bearing B7 with respect to the bearing B7 on the driven shaft 9-side of the two bearings B6 and B7 configured to support the rotation drive shaft 44c. Thereby, the tilt table-side space 14c is in a state where a part on the tilting drive shaft 8-side than the third seal member 54 is partitioned with respect to a space on the further driven shaft 9-side than the third seal member 54 in the accommodation hole 14b for a rotary shaft.

The lubricating oil for lubricating the worm mechanism 44 is stored in the part on the tilting drive shaft 8-side in the tilt table side space 14c. Therefore, the part on the tilting drive shaft 8-side is the storage part (third storage part) 33 corresponding to the worm mechanism 44.

Further, the storage part 34 corresponding to the gear train 45 configured to connect the output shaft 41a of the rotation drive motor 41 and the rotation drive shaft 44c is provided in the space 16a for a gear train of the arm part 16 on the driven shaft 9-side.

More specifically, the through-hole 9c of the driven shaft 9, through which the output shaft 41a of the rotation drive motor 41 penetrates, is provided with an oil seal 55 in a form of being interposed between an inner peripheral surface of the through-hole 9c and an outer peripheral surface of the output shaft 41a. Therefore, the space 16a for a gear train in the arm part 16 on the driven shaft 9-side is in a state where a part configured to communicate with an outside is sealed on the driven shaft 9-side. Note that, an O-ring 56 is interposed between a periphery of the opening of the through-hole 9c in an end surface on the one end-side of the driven shaft 9 and the arm part 16 on the driven shaft 9-side.

In addition, a fourth seal member 57 that is an oil seal 57 is provided in the through-hole 16b, which opens toward the accommodation hole 14b for a rotary shaft, of the arm part 16 on the driven shaft 9-side in a form of being interposed between an inner peripheral surface of the through-hole 16b and the outer peripheral surface of the rotation drive shaft 44c. The space 16a for a gear train is partitioned from the space (tilt table-side space 14c) inside the accommodation hole 14b for a rotary shaft by the fourth seal member 57. In addition, the lubricating oil for lubricating the gear train 45 is stored in the space 16a for a gear train. Therefore, the space 16a for a gear train is the storage part (fourth storage part) 34 corresponding to the gear train 45.

In the machine tool 1 configured as described above, in the present invention, the rotation indexing device 2 of the machine tool 1 has, as a detection device for detecting a height position of an oil level (hereinafter, simply referred to as 'height position') of the lubricating oil stored in the storage parts 31 to 34, a detection device that is provided on a one-to-one basis with respect to a detection target storage part, which is set as a detection target, of the storage parts 31 to 34.

The present embodiment is an example where in the tilting circular table device 2 as the rotation indexing device 2, all of the four storage parts 31 to 34 are set as detection target storage parts and four detection devices 61 to 64 are provided. Further, in the present embodiment, it is assumed that the tilting circular table device 2 includes display devices 71 to 74 configured to display information regarding the height positions detected by the detection devices 61 to 64. The features of the machine tool 1 including the rotation indexing device 2 are specifically described as follows.

As described above, the tilting circular table device 2 includes the first to fourth storage parts 31 to 34. The detection devices 61 to 64 are provided on a one-to-one basis with respect to the respective storage parts 31 to 34. As for each of the detection devices 61 to 64, the detection device (hereinafter, also referred to as 'first detection device') 61 corresponding to the first storage part 31 and the configuration relating thereto are first described.

First, as shown in FIG. 3, in the drive support member 5b of the tilting drive unit 3, the accommodation hole 22b for a worm shaft in the first storage part 31 has a portion (hereinafter, also referred to as 'large-diameter portion') 22c formed in such a form that an inner diameter of the hole 22b is enlarged, above the upper bearing B4 of the upper and lower bearings B4 and B5 configured to support the worm shaft 26c.

In addition, the frame body part 22 in the drive support member 5b of the tilting drive unit 3 is formed with two communication passages (hereinafter, also referred to as 'frame-side communication passages') 22e and 22f provided to be offset in position in the vertical direction of the frame body part 22 and configured to communicate with the large-diameter portion 22c of the accommodation hole 22b for a worm shaft and to open to a side surface (outer side surface) 22d, which faces toward an opposite side to the tilt frame, of both side surfaces in the thickness direction of the frame body part 22.

Note that, the first frame-side communication passage 22e, which is an upper communication passage, of the two frame-side communication passages 22e and 22f is formed to communicate with the large-diameter portion 22c at a position close to an upper end of the large-diameter portion 22c. On the other hand, the second frame-side communication passage 22f on a lower side is formed to communicate with the large-diameter portion 22c at a position close to a lower end of the large-diameter portion 22c. In addition, the frame-side communication passages 22e and 22f are each formed to open to the outer side surface 22d at a position on an opposite side to the worm shaft 26c-side with respect to the tilting drive shaft 8. Therefore, the respective frame-side communication passages 22e and 22f are formed so that the portion configured to communicate with the large-diameter portion 22c extends to a position exceeding the tilting drive shaft 8 in the front and rear direction, and are formed to be bent at the position on the opposite side to the worm shaft 26c-side with respect to the tilting drive shaft 8 and to open to the outer side surface 22d.

Further, as shown in FIGS. 3 and 4, the first detection device 61 is provided in a form of being attached to the outer side surface 22d of the frame body part 22 of the tilting drive unit 3. The first detection device 61 includes a body block 61a attached to the frame body part 22 of the tilting drive unit 3 and a detector 61h attached to the body block 61a.

Among them, the body block 61a is a member having a substantially cuboid shape where four side surfaces are rectangular and upper and lower surfaces are substantially square. The body block 61a is attached to the drive support member 5b of the tilting drive unit 3 on one of the four side surfaces. Therefore, the side surface becomes an attaching surface 61b. Further, the body block 61a is formed with a bottomed hole 61c (hereinafter, also referred to as 'hole for detection'), which is a hole 61c in which the detector 61h, which will be described later, is provided and which opens to an upper surface and closes on a lower surface-side.

Further, the body block 61a is formed with two communication passages (hereinafter, also referred to as 'detector-side communication passages') 61d and 61e provided to be offset in position in a depth direction of the hole 61c for detection and configured to communicate with the hole 61c for detection and to open to the attaching surface 61b. Note that, of the two detector-side communication passages 61d and 61e, the first detector-side communication passage 61d on an upper side and the second detector-side communication passage 61e on a lower side are formed so that an interval therebetween coincides with an interval in the vertical direction between the first frame-side communication passage 22e and the second frame-side communication passage 22f.

Further, the detector 61h is provided in a form of being attached to the upper surface of the body block 61a. As for the detector 61h, in the present embodiment, a so-called guide pulse type level sensor configured to detect a position of the detection target (oil level) by a microwave is adopted. Specifically, the detector 61h includes a detector body part 61i which is a part attached to the upper surface of the body block 61a, and a rod-shaped detection rod 61j provided in a form of protruding from the detector body part 61i.

The detector 61h is configured to calculate a distance to the detection target by a time until the microwave transmitted from the detector body part 61i toward the detection target is reflected on the detection target (oil level) and received by the detector body part 61i. In addition, the detection rod 61j is for assisting transmission/reception of the microwave in the detector body part 61i. The detector 61h is attached at the detector body part 61i to the upper surface of the body block 61a in such a form that the detection rod 61j is located in the hole 61c for detection of the body block 61a.

In addition, the first detection device 61 is attached at the attaching surface 61b to the outer side surface 22d of the frame body part 22 of the drive support member 5b of the tilting drive portion 3 in such an arrangement that the first detector-side communication passage 61d communicates with the first frame-side communication passage 22e and the second detector-side communication passage 61e communicates with the second frame-side communication passage. Thereby, the hole 61c for detection of the first detection device 61 is in a state of communicating with the first storage part 31 via the respective detector-side communication passages 61d and 61e and the respective frame-side communication passages 22e and 22f. Note that, an O-ring 61p is interposed between a periphery of the opening of the first detector-side communication passage 61d in the attaching surface 61b of the body block 61a and the outer side surface 22d of the frame body part 22. In addition, an O-ring 61q is interposed between a periphery of the opening of the second detector-side communication passage 61e in the attaching surface 61b of the body block 61a and the outer side surface 22d of the frame body part 22.

As a result, in a state where the oil level of the lubricating oil stored in the first storage part 31 for lubricating the worm mechanism 44 described above exists between the first frame-side communication passage 22e and the second frame-side communication passage 22f in the large-diameter portion 22c in the vertical direction, the lubricating oil flows into the hole 61c for detection through the second frame-side communication passage 22f and the second detector-side communication passage 61e and the height position in the hole 61c for detection and the height position in the first storage part 31 coincide with each other.

Note that, as for the lubricating oil stored in the first storage part 31, in the present embodiment, the upper and lower bearings B4 and B5 configured to support the worm shaft 26c are also subjected to lubrication by the lubricating oil. Therefore, the height position in the first storage part 31 is required to be above at least the upper bearing B4.

Therefore, a lower limit of the height position is set to a position slightly above the upper bearing B4.

Further, in the first storage part 31, the large-diameter portion 22c described above is formed immediately above the upper bearing B4, and the second frame-side communication passage 22f on the lower side of the two frame-side communication passages 22e and 22f is formed to communicate with the large-diameter portion 22c at a position close to the lower side of the large-diameter portion 22c as described above. Thereby, even when the height position in the first storage part 31 becomes the lower limit, the height position in the hole 61c for detection coincides with the height position in the first storage part 31. Therefore, even a state where the height position in the first storage part 31 is the lower limit can be detected by the first detection device 61.

In addition, as for the upper limit of the height position, in the tilting circular table device 2, a temperature of the lubricating oil may rise during an operation, and a volume of the lubricating oil may expand as the temperature rises. In this case, if a size of a space above the oil level in the first storage part 31 in an initial state before operating the tilting circular table device 2 is too small to allow the expansion, a pressure of the lubricating oil rises with the expansion during the operation. Therefore, it is desired that the height position in the initial state is a position where a space having a size that allows the expansion at least during the operation is formed above the oil level. Therefore, the height position in the initial state is defined as a position where such a space is formed above the oil level.

Further, the first frame-side communication passage 22e on the upper side is formed to communicate with the large-diameter portion 22c at a position close to the upper end of the large-diameter portion 22c as described above. That is, the first frame-side communication passage 22e is formed so that the hole 61c for detection communicates with the space formed above the oil level in the first storage part 31. As a result, air can move between the first storage part 31 and the hole 61c for detection. Thereby, even in a state where the height position in the first storage part 31 is located near the upper end of the first storage part 31, the height position in the hole 61c for detection coincides with the height position in the first storage part 31. Therefore, even a state where the height position in the first storage part 31 is located near the upper end of the first storage part 31 can be detected by the first detection device 61.

Next, the detection device (hereinafter, also referred to as 'second detection device') 62 corresponding to the second storage part 32 and the configuration relating thereto are described. Note that, the configuration of the second detection device 62 itself is almost the same as the configuration of the first detection device 61 described above.

First, as shown in FIGS. 2 and 3, the second storage part 32 includes the internal space 23a of the motor attaching part 23 in the drive support member 5b of the tilting drive unit 3, as described above. In addition, the motor attaching part 23 has two through-holes 22i and 22j formed to be lined up in the vertical direction in a sidewall 22h including a side surface (outer side surface 23d) facing toward the same side as the outer side surface 22d of the frame body part 22 to which the first detection device 61 is attached. Therefore, the through-holes 22i and 22j allow the internal space 23a of the motor attaching part 23 to communicate with an outside, and the two through-holes 22i and 22j correspond to the frame-side communication passages 22e and 22f in the configuration relating to the first detection device 61 described above.

Note that, the upper through-hole 22i of the two through-holes 22i and 22j is provided to open to the internal space 23a at a position close to an upper end in the internal space 23a. On the other hand, the lower through-hole 22j is provided to open to the internal space 23a on a further lower side than the gear train 27 in the motor attaching part 23.

Further, the second detection device 62 is provided in a form of being attached to the outer side surface 23d of the motor attaching part 23. However, in the second detection device 62, an interval between the two detector-side communication passages in a body block 62a (the first detector-side communication passage 62d on the upper side and the second detector-side communication passage 62e on the lower side) coincides with an interval between the two through-holes 22i and 22j of the motor attaching part 23 described above.

The second detection device 62 is attached at an attaching surface 62b to the outer side surface 23d of the motor attaching part 23 in such an arrangement that the first detector-side communication passage 62d communicates with the upper through-hole 22i of the motor attaching part 23 and the second detector-side communication passage 62e communicates with the lower through-hole 22j. Thereby, a hole 62c for detection in the second detection device 62 is in a state of communicating with the second storage part 32 via the respective detector-side communication passages 62d and 62e and the respective through-hole 22i and 22j.

Note that, as for the lubricating oil stored in the second storage part 32, the height position in the initial state is set to a position where a space having a size that allows the expansion at least during the operation is formed above the oil level, as is the case with the height position in the first storage part 31. The upper through-hole 22i is provided at the position close to the upper end in the internal space 23a as described above, and the height position in the hole 62c for detection is made to coincide with the height position in the internal space 23a, so that the height position can be detected by the second detection device 62.

Further, the height position is required to be above the lower surface of the gear train 27 to be lubricated. Therefore, the lower through-hole 22j is provided below the gear row 27, as described above. That is, the second detection device 62 is provided to be able to detect the height position up to a position below the gear train 27. However, a lower limit of the height position of the lubricating oil in the second storage part 32 is set to a position slightly above the lower surfaces of all the gears 27a, 27b and 27c included in the gear row 27. Note that, an O-ring 62p is interposed between a periphery of the opening of the first detector-side communication passage 62d in the attaching surface 62b of the body block 62a and the outer side surface 23d of the motor attaching part 23. In addition, an O-ring 62q is interposed between a periphery of the opening of the second detector-side communication passage 62e in the attaching surface 62b of the body block 62a and the outer side surface 23d of the motor attaching part 23.

Next, as shown in FIG. 6, the detection device (hereinafter, also referred to as 'third detection device') 63 corresponding to the third storage part 33 and the configuration relating thereto are described.

First, in the tilt table 14 described above, the accommodation hole 14b for a rotary shaft in the third storage part 33 is formed such that a portion in which the worm 44b is accommodated is a large-diameter portion (hereinafter, also referred to as 'large-diameter portion for a worm') 14d whose inner diameter is enlarged than the other portions. In addition, as shown in FIG. 2, the tilt table 14 has two through-holes 14*h* and 14*i* formed to be lined up in the plate thickness direction in a front wall 14*f* including a front side surface 14*e* of the tilt table 14.

Note that, as shown in FIG. 6, the upper through-hole 14*h* of the two through-holes 14*h* and 14*i* is formed to open to the large-diameter portion 14*d* for a worm at a position close to an upper surface-side (upper end) of the tilt table 14 in the plate thickness direction of the large-diameter portion 14*d* for a worm. On the other hand, the lower through-hole 14*i* is formed to open to the large-diameter portion 14*d* for a worm at a position close to a lower surface-side (lower end) of the tilt table 14 in the plate thickness direction of the large-diameter portion 14*d* for a worm.

Further, the third detection device 63 is provided in a form of being attached to the front side surface 14*e* of the tilt table 14. Note that, in the third detection device 63, a body block 63*a* is formed such that upper and lower surfaces thereof also form a rectangular shape, as compared to the body blocks 61*a* and 62*a* of the first and second detection devices 61 and 62. However, the upper and lower surfaces forming the rectangular shape are surfaces whose dimension in a long side direction is sufficiently larger than a dimension in a short side direction. Therefore, two of the four side surfaces are also formed as surfaces (hereinafter, also referred to as 'laterally long side surfaces) whose dimension in the long side direction is sufficiently larger than the dimension in the short side direction. The third detection device 63 is attached to the tilt table 14 at one of the laterally long side surfaces thereof, and the laterally long side surface thereof is an attaching surface 63*b*.

In addition, as shown in FIG. 2, the body block 63*a* is formed with a hole 63*c* for detection opening to an upper surface thereof at a position close to one end-side in the long side direction. Further, in the body block 63*a*, two detector-side communication passages 63*d* and 63*e* configured to communicate with the hole 63*c* for detection are formed to open to the attaching surface 63*b* at positions close to the other end-side in the long side direction. In addition, an interval between openings on the attaching surface 63*b* of the two detector-side communication passages 63*d* and 63*e* in the body block 63*a* (the first detector-side communication passage on an upper side and the second detector-side communication passage on a lower side) coincides with an interval between the two through-holes 14*h* and 14*i* of the tilt table part 14 described above.

Further, the third detection device 63 is attached at the attaching surface 63*b* to the front side surface 14*e* of the tilt table 14 in such an arrangement that the first detector-side communication passage 63*d* communicates with the upper through-hole 14*h* of the tilt table 14 and the second detector-side communication passage 61*e* communicates with the lower through-hole 14*i*. Therefore, the two through-holes 14*h* and 14*i* in the tilt table 14 correspond to the frame-side communication passages 22*e* and 22*f* in the configuration relating to the first detection device 61 described above. Note that, as shown in FIG. 6, an O-ring 63*p* is interposed between a periphery of the opening of the first detector-side communication passage 63*d* in the attaching surface 63*b* of the body block 63*a* and the front side surface 14*e* of the tilt frame 14. In addition, an O-ring is interposed between a periphery of the opening of the second detector-side communication passage 63*e* in the attaching surface 63*b* of the body block 63*a* and the front side surface 14*e* of the tilt frame 14.

Note that, as for the lubricating oil stored in the third storage part 33, in a state (hereinafter, also simply referred to as 'horizontal state') of the tilting circular table device 2 where the upper surface of the rotary table 7 is oriented to be parallel to the horizontal direction, the height position is required to be above a meshing position in the worm mechanism 44 (the worm 44*b* and the worm wheel 44*a*) to be lubricated. Therefore, the lower through-hole 14*i* is provided at a position close to the lower end of the large-diameter portion 14*d* for a worm. However, a lower limit of the height position of the lubricating oil in the third storage part 33 is set to a position slightly above the meshing position.

Further, as for an upper limit of the height position, the third storage part 33 includes the accommodation hole 14*a* for a support shaft as described above, and the accommodation hole 14*a* for a support shaft has a portion above the large-diameter portion 14*d* for a worm in the horizontal state. Therefore, the third storage part 33 is configured such that, even when the large-diameter portion 14*d* for a worm is filled with the lubricating oil, the accommodating hole 14*a* for a support shaft allows the lubricating oil to expand during the operation of the tilting circular table device 2.

However, if the large-diameter portion 14*d* for a worm is filled with the lubricating oil, in the configuration where the through-holes (frame-side communication passages) 14*h* and 14*i* are formed at the positions as described above, the air cannot move between the storage part (large-diameter portion 14*d* for a worm) 33 and the hole 63*c* for detection. Therefore, for the third storage part 33, the upper limit of the height position is set to a position slightly lower than the upper through-hole (frame-side communication passage) 14*h* in the horizontal state. The upper limit of the height position is set with respect to the upper through-hole 14*h* in this way, so that it is possible to detect the height position in the third storage part 33 by the third detection device 63.

Next, the detection device (hereinafter, also referred to as 'fourth detection device') 64 corresponding to the fourth storage part 34 and the configuration relating thereto are described. Note that, the configuration of the fourth detection device 64 itself is almost the same as the configuration of the first detection device 61 described above.

First, the fourth storage part 34 includes the space 16*a* for a gear train in the arm part 16 on the driven shaft 9-side as described above. In addition, as shown in FIG. 2, the arm part 16 on the driven shaft 9-side of the rotation drive unit 4 has two through-holes 16*h* and 16*i* formed to be lined up in the vertical direction in a front wall 16*e* including a surface (a front side surface 16*d* of the arm part 16 on the driven shaft 9-side) facing toward the same side as the front side surface 14*e* of the tilt table 14. Therefore, the through-holes 16*h* and 16*i* allow the space 16*a* for a gear train of the arm part 16 on the driven shaft 9-side to communicate with an outside, and the two through-holes 16*h* and 16*i* correspond to the frame-side communication passages 22*e* and 22*f* in the configuration relating to the first detection device 61 described above.

Note that, the lower through-hole 16*i* of the two through-holes 16*h* and 16*i* is formed to penetrate through the front wall 16*e* at a position lower than the transmission gear 45*b* in the space 16*a* for a gear train in the horizontal state. Further, as shown in FIGS. 2 and 6, the upper through-hole 16*h* is formed to penetrate through the front wall 16*e* at a position where an interval from the lower through-hole 16*i* coincides with the interval between two detector-side communication passages 64*d* and 64*e* in a body block 64*a* of the fourth detector 64.

The fourth detection device 64 is attached at the attaching surface 64*b* to the front side surface 16*d* of the arm part 16 on the driven shaft 9-side in such an arrangement that the first detector-side communication passage 64d communicates with the upper through-hole 16h of the arm part 16 on the driven shaft 9-side and the second detector-side communication passage 64e communicates with the lower through-hole 16i. Thereby, the hole 64c for detection in the fourth detection device 64 is in a state of communicating with the fourth storage part 34 via the respective detector-side communication passages 64d and 64e and the respective through-hole 16h and 16i. Note that, an O-ring 64p is interposed between a periphery of the opening of the first detector-side communication passage 64d in the attaching surface 64b of the body block 64a and the front side surface 16d of the arm part 19 on the driven shaft 9-side. In addition, an O-ring is interposed between a periphery of the opening of the second detector-side communication passage 64e in the attaching surface 64b of the body block 64a and the front side surface 16d of the arm part 19 on the driven shaft 9-side.

Note that, as for the lubricating oil stored in the fourth storage part 34, the drive gear 45a, which is the uppermost of the gear train 45 to be lubricated in the horizontal state, is indirectly lubricated as the transmission gear 45b in mesh with the drive gear 45a is lubricated. Therefore, the height position is required to be a position where at least the transmission gear 45b is lubricated by the lubricating oil. Therefore, a lower limit of the height position is set to a position slightly above the meshing position of the transmission gear 45b and the driven gear 45c in the horizontal state.

Further, as for an upper limit of the height position, the fourth storage part 34 includes the space 16a for a gear train as described above, and the space 16a for a gear train is a space where there is a large space above the gear train 45 (drive gear 45a). Therefore, the fourth storage part 34 can allow the expansion of the lubricating oil during the operation of the tilting circular table device 2, even when the space 16a for a gear train is filled with the lubricating oil so that the gear row 45 is immersed.

However, as is the case with the other detection devices 61 to 63, it is necessary that the air can move between the space 16a for a gear train and the hole 64c for detection. Therefore, also for the fourth storage part 34, as is the case with the third storage part 33, the upper limit of the height position is set to a position slightly lower than the upper through-hole (frame-side communication passage) 16h in the horizontal state. The upper limit of the height position is set with respect to the upper through-hole 16h in this way, so that it is possible to detect the height position in the fourth storage part 34 by the third detection device 64.

Further, as shown in FIG. 2, in the present embodiment, the tilting circular table device 2 includes the display devices 71 to 74 connected to the detection devices 61 to 64 and configured to display information regarding the height positions detected by the detection devices 61 to 64. In the present embodiment, the display devices 71 to 74 are provided on a one-to-one basis with respect to the respective detection devices. Therefore, the tilting circular table device 2 of the present embodiment is provided with the four display devices 71 to 74. However, in the present embodiment, the respective display devices 71 to 74 are provided integrally with the detectors 61h to 64h in a form of being attached to the upper portions of the detector body parts 61i to 64i of the detectors 61h to 64h of the corresponding detection devices 61 to 64. Further, it is assumed that the configurations of the display devices 71 to 74 themselves are the same in each of the detection devices 61 to 64.

In addition, the information regarding the height positions displayed by the display devices 71 to 74 is detection results (distances from the detector body parts 61i to 64i to the oil level) by the detectors 61h to 64h of the respective detection devices 61 to 64. It is assumed that the display devices 71 to 74 are configured to display the detection results in numerical values. Therefore, the respective display devices 71 to 74 include display units 71a to 74a configured to display numbers corresponding to the detection results in the corresponding detection devices 61 to 64.

Note that, the respective display devices 71 to 74 are provided integrally with the detectors 61h to 64h as described above, and are provided inside the exterior cover 1f of the machine tool 1. Therefore, the respective display devices 71 to 74 are provided in directions in which the operator can visually observe the display units 71a to 74a from an outside of the exterior cover 1f in the initial state and the horizontal state described above.

According to the machine tool 1 including the tilting circular table device 2 described above, the height positions of the lubricating oil stored in the respective storage parts 31 to 34 of the first to fourth storage parts 31 to 34, which are the detection target storage parts, are detected by the detection devices 61 to 64 provided on a one-to-one basis with respect to the respective storage parts 31 to 34. The detection results by the detection devices 61 to 64 are displayed on the display units 71a to 74a of the display devices 71 to 74 provided integrally with the detectors 61h to 64h of the detection devices 61 to 64. Therefore, the operator can check the detection results by visually observing the display units 71a to 74a (display contents).

Note that, as described above, the detection results are the distances from the detector 61h to 64h (detector body parts 61i to 64i) to the oil level. However, since a relationship between the height position (oil amount) of the oil level in each of the storage parts 31 to 34 and the distance is unique, the operator can perceive the height position by checking the distance. In addition, although the upper limit and the lower limit of the height position are set for each of the storage parts 31 to 34 as described above, the state of the height position with respect to the upper limit and the lower limit can also be perceived. For example, for each of the storage parts 31 to 34, the upper limit and the lower limit of the height position are converted into the distances and the values can be checked by the operator, so that the upper limit and the lower limit can be compared with the detection results more easily.

As described above, the respective display devices 71 to 74 are provided so that the display units 71a to 74a can be visually recognized even from the outside of the exterior cover 1f of the machine tool 1. Therefore, for example, before start of an operation of the machine tool 1 where the tilting circular table device 2 is in the initial state (horizontal state), the state of the height position in each of the storage parts 31 to 34 can be easily checked from the outside of the exterior cover 1f. Therefore, according to such a machine tool 1, as compared to the machine tool 1 including the rotation indexing device of the related art in which the oil amount is managed by using the oil gauge, the state of the height position in each of the storage parts 31 to 34 can be easily perceived by the operator.

Note that, the present invention is not limited to the above-described embodiment (the above embodiment), and can also be implemented in following other embodiments (modified embodiments).

(1) As for the rotation indexing device included in the machine tool that is the preamble of the present invention, in the above embodiment, the tilting circular table device 2 including the two types of the rotation indexing devices 3 and 4 of the tilting drive unit 3 and the rotation driving unit 4 is adopted. However, the rotation indexing device in the present invention is not limited to such a tilting circular table device, and may also be a tilting table device constituted only by a rotation indexing device corresponding to the tilting drive unit 3 of the above embodiment, or a circular table device constituted only by a rotation indexing device corresponding to the rotation drive unit of the above embodiment.

In addition, the circular table device may also be a so-called vertical circular table device configured to index an angular position of a rotation target member around an axis line in a horizontal direction, or a so-called horizontal circular table device configured to index an angular position of a rotation target member around an axis line in a vertical direction.

Note that, as for each rotation indexing device, in the above embodiment, the rotary shaft (the tilting drive shaft 8, the support shaft 17) to which the rotation target member is attached and the drive motor are connected to each other via the two gear mechanisms of the worm mechanism and the gear train. As a result, each rotation indexing device has the two storage parts. However, in the present invention, the rotation indexing device may also be configured to connect the rotary shaft and the drive motor by one gear mechanism such as a worm mechanism. In this case, there is only one storage part in the rotation indexing device.

(2) As for the detection target storage part, in the above embodiment, in the configuration where the four storage parts 31 to 34 are included in the rotation indexing device, all of the four storage parts 31 to 34 are set as the detection target storage part. That is, all the storage parts 31 to 34 included in the rotation indexing device are set as the detection target storage part. However, in the present invention, even when the rotation indexing device includes a plurality of storage parts, not all of them may be set as the detection target storage part, and only some of the storage parts may be set as the detection target storage part.

(3) As for the detection device, in the above embodiment, the detection device employs the guide pulse type level sensors as the detectors 61h to 64h. However, in the present invention, the detection device may also adopt, for example, an ultrasonic type level sensor or a laser type level sensor, as the detector.

Further, in the present invention, the detection device is not limited to the one that employs a detector capable of linearly detecting a position of such a detection target (oil level), and may also be one that adopts a detector (for example, an optical type level sensor, a float type level sensor) capable of detecting that a detection target (oil level) has reached (exceeded) a predetermined detection position.

Note that, such a detector cannot detect the height position itself, like the detector of the above embodiment. However, for example, the lower limit of the height position described above may be set as the detection position, so that it is possible to perceive that the height position has fallen below the lower limit, which is a problem in lubricating the gear mechanism. In this respect, it is possible to control the oil amount. Therefore, in terms of controlling the oil amount, which is the object of the present invention, even when the detector is such a detector, it can handle the control. The detection device in the present invention 'detects the height position', but the 'detection of the height position' also includes detecting the state of the height position.

(4) As for the display device, the above embodiment is an example where the display devices 71 to 74 configured to display the information regarding the height positions detected by the detection devices 61 to 64 are provided. In addition, the display devices 71 to 74 are provided integrally with the detectors 61h to 64h of the corresponding detection devices 61 to 64. However, even when the machine tool is provided with such a display device, the display device is not limited to being provided integrally with the detector, in the present invention. For example, the display device may be provided in a form of being attached to the outer surface of a peripheral wall 1h of the exterior cover 1f on the outside of the exterior cover 1f of the machine tool 1. Further, the display device is not limited to displaying the detection result by the detection device in numerical values, as is the case with the above embodiment, and may also be configured to display a message corresponding to the detection result in characters, to turn on a warning light according to the detection result, and the like.

However, in the present invention, it is not essential that such a display device is provided, and the machine tool according to the present invention may not be provided with the display device. For example, instead of the display device described above, an alarm device configured to emit a warning sound according to the detection result of the detection device may be provided. Further, the information regarding the height position detected by the detection device may be output to a control device of the machine tool and used by the control device of the machine tool. Note that, the using method by the control device is, for example, a method of preventing the machine tool from being operated when information corresponding to the height position falling below the lower limit is input to the control device, and the like.

(5) As for the machine tool, the above embodiment is an example where the present invention is applied to the machine tool 1 (so-called horizontal machining center) in which the direction of the rotation axis line of the main shaft 1a is a horizontal direction. However, the machine tool to which the present invention is applied is not limited to the horizontal machining center, and may also be, for example, a machine tool (so-called vertical machining center) in which the direction of the rotation axis line of the main shaft is a vertical direction.

The present invention is not limited to any embodiment described above, and can be appropriately changed without departing from the gist of the present invention.

The invention claimed is:

1. A machine tool comprising:
a rotation indexing device configured to index an angular position of a rotation target member attached to an end portion of a rotary shaft, the rotation indexing device including:
a frame configured to accommodate the rotary shaft in a state of rotatably supporting the rotary shaft;
a drive motor configured to rotationally drive the rotary shaft;
a drive transmission mechanism accommodated in a space inside the frame and configured to transmit rotation of an output shaft of the drive motor to the rotary shaft, the drive transmission mechanism including a gear mechanism having a plurality of gears in mesh with each other, the space including one or more storage parts configured to store lubricating oil for lubricating at least the gear mechanism, corresponding to the gear mechanism, and partitioned with respect to other part in the space inside the frame by a seal member;
a detection device configured to detect a height position of an oil level of the lubricating oil stored in the one or more storage parts, and being provided on a one-to-one basis with respect to a detection target storage part, which is set as a detection target, of the one or more storage parts; and a display device connected to the detection device and configured to display information regarding the height position detected by the detection device and to display the information regarding the height position in a number.

2. The machine tool according to claim 1, wherein the display device is provided on an outside of a cover configured to cover a machining area where the rotation indexing device is arranged and a workpiece is machined.

* * * * *